(12) United States Patent
Phillips et al.

(10) Patent No.: US 9,337,683 B2
(45) Date of Patent: May 10, 2016

(54) CONTROLLING BATTERY STATES OF CHARGE IN SYSTEMS HAVING SEPARATE POWER SOURCES

(71) Applicants: Jeffrey Phillips, La Jolla, CA (US); Salil Soman, San Diego, CA (US)

(72) Inventors: Jeffrey Phillips, La Jolla, CA (US); Salil Soman, San Diego, CA (US)

(73) Assignee: PowerGenix Systems, Inc., San Diego, CA (US)

( * ) Notice: Subject to any disclaimer, the term of this patent is extended or adjusted under 35 U.S.C. 154(b) by 643 days.

(21) Appl. No.: 13/722,815

(22) Filed: Dec. 20, 2012

(65) Prior Publication Data

US 2014/0175869 A1    Jun. 26, 2014

(51) Int. Cl.
*B60R 16/03* (2006.01)
*H02J 7/00* (2006.01)
(Continued)

(52) U.S. Cl.
CPC .............. *H02J 7/0073* (2013.01); *B60L 1/00* (2013.01); *B60L 11/1862* (2013.01); *B60L 11/1866* (2013.01); *B60L 15/2045* (2013.01); *H02J 7/0081* (2013.01); *H02J 7/041* (2013.01); *H02J 7/045* (2013.01); *H02J 7/14* (2013.01); *Y02T 10/7005* (2013.01); *Y02T 10/7044* (2013.01);
(Continued)

(58) Field of Classification Search
CPC ......... H02J 7/00; H02J 7/0073; H02J 7/0081; H02J 7/041; H02J 7/045; H02J 7/14; B60L 1/00; B60L 11/1862; B60L 11/1866; B60L 15/2045

USPC ......................................................... 307/10.1
See application file for complete search history.

(56) References Cited

U.S. PATENT DOCUMENTS

| 5,215,836 | A |   | 6/1993 | Eisenberg |
| 6,194,874 | B1 | * | 2/2001 | Kalogeropoulos et al. ... 320/160 |

(Continued)

FOREIGN PATENT DOCUMENTS

| EP | 0293664 A2 | 12/1998 | |
| JP | 08222277 A | * 8/1996 | ............ H01M 10/44 |

(Continued)

OTHER PUBLICATIONS

International Search Report and Written Opinion dated Sep. 5, 2013 in PCT Application No. PCT/US2012/071024.

(Continued)

*Primary Examiner* — Thienvu Tran
*Assistant Examiner* — David M Stables
(74) *Attorney, Agent, or Firm* — Weaver Austin Villeneuve & Sampson LLP

(57) ABSTRACT

A control system is designed or configured to control the state of charge of a battery or battery pack in a system containing a separate power source, which is separate from the battery or battery pack. In operation, the battery or battery pack is called upon to intermittently provide power for certain functions. The separate power source may be, for example, an AC electrical power source for a UPS or an engine of a vehicle such as a micro hybrid vehicle. The battery may be a nickel zinc aqueous battery. The control system may be designed or configured to implement one or more of the following functions: monitoring the state of charge of the battery or battery pack; directing rapid recharge of the battery or battery pack from the separate power source when the battery or battery pack is not performing its functions; and directing charge to fully charged level or a float charge level, which is different from the fully charged level, in response to operating conditions.

29 Claims, 2 Drawing Sheets

(51) Int. Cl.
*H02J 7/04* (2006.01)
*H02J 7/14* (2006.01)
*B60L 1/00* (2006.01)
*B60L 11/18* (2006.01)
*B60L 15/20* (2006.01)

(52) U.S. Cl.
CPC .......... *Y02T 10/7061* (2013.01); *Y02T 10/7283* (2013.01)

(56) References Cited

U.S. PATENT DOCUMENTS

| | | |
|---|---|---|
| 6,797,433 B2 | 9/2004 | Phillips |
| 6,811,926 B2 | 11/2004 | Phillips |
| 6,818,350 B2 | 11/2004 | Phillips |
| 6,835,499 B2 | 12/2004 | Phillips |
| 7,550,230 B2 | 6/2009 | Phillips et al. |
| 2002/0182501 A1 | 12/2002 | Phillips |
| 2006/0240317 A1 | 10/2006 | Phillips et al. |
| 2009/0126360 A1* | 5/2009 | Bordwell et al. ............... 60/413 |
| 2010/0033138 A1* | 2/2010 | Alger et al. ................... 320/153 |
| 2010/0291439 A1 | 11/2010 | Phillips et al. |
| 2011/0033747 A1 | 2/2011 | Phillips et al. |
| 2011/0204720 A1* | 8/2011 | Ruiz et al. ....................... 307/66 |
| 2014/0030567 A1 | 1/2014 | McKinney et al. |

FOREIGN PATENT DOCUMENTS

| | | |
|---|---|---|
| JP | H08-222277 A | 8/1996 |
| WO | WO 00/55957 A1 | 9/2000 |
| WO | WO 02/39517 | 5/2002 |
| WO | WO 02/39520 | 5/2002 |
| WO | WO 02/39521 | 5/2002 |
| WO | WO 02/39534 | 5/2002 |
| WO | WO 02/075830 | 9/2002 |
| WO | WO 2005/020353 | 3/2005 |
| WO | WO 2006/116496 | 11/2006 |
| WO | WO 2008/036948 A2 | 3/2008 |

OTHER PUBLICATIONS

Phillips, Jeffrey, PowerGenix, Presentation: An Energy Storage Solution for Next Generation Micro-Hybrid Systems, at Advanced Automotive Battery Conference (AABC) Europe 2012, Mainz, Germany, Jun. 2012.
Hadjipaschalis, Ioannis, et al. Overview of current and future energy storage technologies for electric power applications, Renewal and Sustainable Energy Reviews, vol. 13, No. 6-7, Aug. 2009, pp. 1513-1522.
Nelson, Robert F., Power requirements for batteries in hybrid electric vehicles, Journal of Power Sources, vol. 91, Nov. 2000, pp. 2-26.
International Preliminary Report on Patentability dated Jul. 2, 2015 in PCT Application No. PCT/US2012/071024.
Description of Experimental Vehicle by PowerGenix, believed to be tested prior to the filing date (Dec. 20, 2012) of the subject patent application, 2 pp.

\* cited by examiner

CONTROLLING BATTERY STATES OF CHARGE IN SYSTEMS HAVING SEPARATE POWER SOURCES

BACKGROUND

Rechargeable batteries are used for many purposes. One application of increasing importance is as a power source for automobiles and other vehicles. In many cases, batteries are used to cold crank internal combustion engines. They are also used to power a vehicle's cabin accessories such as lights, audio systems, navigation systems, seat warmers, etc. With the market establishment of hybrid and all electric automobiles, rechargeable batteries are increasingly used to power the propulsion of the automobile. Another common application for rechargeable batteries is in uninterruptible power supplies (UPS), which provide emergency power to a load in the event that a primary source of power goes down. UPSs are commonly used to ensure near instantaneous protection from loss due to power outages for data centers, telecommunications equipment and other critical electrical equipment.

Battery Management Units (BMUs) are sometimes employed to control the charging and to maintain a suitable state of charge in battery packs for applications such as automotive and UPS applications. An alternator may be used to deliver electronic charge to the batteries.

SUMMARY

A control system is designed or configured to control the state of charge of a battery or battery pack in a system containing a separate power source, which is separate from the battery or battery pack. In operation, the battery or battery pack is called upon to intermittently provide power for certain functions. The separate power source may be, for example, an AC electrical power source for a UPS or an engine of a vehicle such as a micro hybrid vehicle. The battery may be a nickel zinc aqueous battery. The control system may be designed or configured to implement one or more of the following functions: monitoring the state of charge of the battery or battery pack; directing rapid recharge of the battery or battery pack from the separate power source when the battery or battery pack is not performing its functions; and directing charge to fully charged level or a float charge level, which is different from the fully charged level, in response to operating conditions.

One aspect of the present disclosure concerns a method of controlling the state of charge of one or more nickel-zinc batteries in a battery pack for a system that has a separate power source working in conjunction with the battery pack having a full charge mode and a float charge mode. This method includes determining that the state of charge of the one or more nickel-zinc batteries in the battery pack is below a defined level associated with the full charge mode, then, while in the full charge mode, applying charge to the battery pack at a first voltage to charge the one or more nickel-zinc batteries of the battery pack to a fully charged state, and, subsequently, while operating the system in the float charge mode, applying charge to the battery pack at a second voltage to maintain the one or more nickel-zinc batteries of the battery pack at a float charged state. The magnitude of the second voltage is below the magnitude of the first voltage. The charge to the fully charged state and the charge to the float charge are provided from the separate power source. In one aspect, providing the charge from the separate power source to charge the one or more nickel-zinc batteries in the battery pack is accomplished by providing power from the separate power source to an alternator electrically coupled to the battery pack.

In certain embodiments, the separate power source may be an internal combustion engine. In other embodiments, it may be an AC electric power source. In a specific implementation, the battery pack contains exactly 7 batteries, while in another, the battery pack contains exactly 8 batteries.

In a specific implementation, the first voltage of the method is between about 1.82 and 1.95 volts. In another specific implementation, the second voltage of the method is between about 1.75 and 1.87 volts.

In a particular embodiment, charging the one or more nickel-zinc batteries of the battery pack to the fully charged state is conducted at a rate of at least about 1 C. In another embodiment, charging the one or more nickel-zinc batteries of the battery pack to the float charge state is conducted at a rate of at least about 1 C.

In certain embodiments, the system may be an electrical system of vehicle. In such cases, prior to determining that the state of charge of the one or more nickel-zinc batteries in the battery pack is below a defined level associated with the full charge mode, the method further includes discharging the one or more nickel-zinc batteries in the battery pack below the defined level associated with the full charge mode. Typically, the discharging is conducted to perform an electrical function for the vehicle. In certain embodiments, the electrical function is cold cranking an internal combustion engine of the vehicle, powering cabin electronics of the vehicle, and/or powering power steering of the vehicle.

Additionally, the method may involve, prior to operating the system in the float charge mode, partially discharging the one or more nickel-zinc batteries in the battery pack to perform the electrical function for the vehicle.

In another case, the system could be an uninterruptible power supply. In such a case, prior to determining that the state of charge of the one or more nickel-zinc batteries in the battery pack is below a defined level associated with the full charge mode, the method includes discharging the one or more nickel-zinc batteries in the battery pack below the defined level associated with the full charge mode, wherein the discharging is conducted to provide backup power for the separate power source.

In some embodiments, the method determines the temperature of battery pack and/or the one or more nickel-zinc batteries in the battery pack and calculating the fully charged state as a function of temperature. In one example, calculating the voltage applied for charging to the fully charged state includes evaluating the following expression: Voltage(fully charged)=1.9−0.002*(Temperature in Celsius-22). In yet another embodiment, the method includes determining the temperature of battery pack and/or the one or more nickel-zinc batteries in the battery pack and calculating the float charge state as a function of temperature.

Another aspect of the disclosure concerns a controller for controlling the state of charge of one or more nickel-zinc batteries in a battery pack. The battery pack may be designed or configured for use in a system that includes (a) a separate power source working in conjunction with the battery pack and (b) a full charge mode and a float charge mode. This controller may be characterized by a communications interface for communicating with an alternator and/or an engine control unit, and logic for (i) determining that the state of charge of the one or more nickel-zinc batteries in the battery pack is below a defined level associated with the full charge mode, (b) while in the full charge mode, applying charge to the battery pack at a first voltage to charge the one or more nickel-zinc batteries of the battery pack to a fully charged state, and, (c) subsequently, while operating the system in the float charge mode, applying charge to the battery pack at a second voltage to maintain the one or more nickel-zinc batteries of the battery pack at a float charged state. The magnitude of the second voltage is below the magnitude of the first voltage. The charge for charging to the fully charged state is provided from the separate power source. As well, the charge for charging to the float charge state is provided from the separate power source.

In certain embodiments, the controller logic of the controller may be further designed or configured for determining that the separate power source is operational prior to applying charge to the battery pack at a first voltage to charge the one or more nickel-zinc batteries of the battery pack to a fully charged state.

In a specific implementation, the first voltage of the controller is between about 1.87 and 1.95 volts. In another specific implementation, the second voltage of the controller is between about 1.75 and 1.87 volts.

In a certain embodiment, the controller logic of the controller is further designed or configured for determining the temperature of battery pack and/or the one or more nickel-zinc batteries in the battery pack and calculating the fully charged state as a function of temperature. In this case, calculating the fully charged state includes evaluating the following expression: Voltage(fully charged)=$1.9-0.002*$(Temperature in Celsius-22).

In yet another embodiment, the controller logic of the controller is further designed or configured for determining the temperature of battery pack and/or the one or more nickel-zinc batteries in the battery pack and calculating the float charge state as a function of temperature.

In one aspect, the controller logic of the controller is further designed or configured for charging the one or more nickel-zinc batteries of the battery pack to the fully charged state at a rate of at least about 1 C. In another, the controller logic of the controller is further designed or configured for charging the one or more nickel-zinc batteries of the battery pack to the float charge state at a rate of at least about 1 C.

These and other features of the disclosed embodiments will be set forth in further detail below, with reference to the associated drawings.

DETAILED DESCRIPTION

Introduction

Figure 1A:
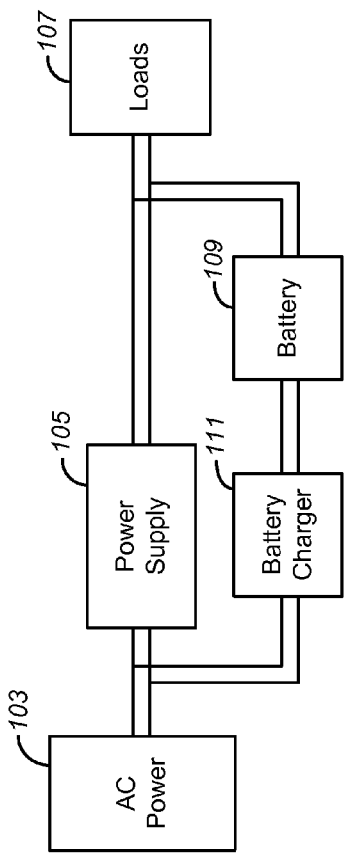
FIG. 1A is a block diagram of an uninterruptible power supply integrated with a power source and a load.

Aspects of this disclosure concern battery charge management. The batteries managed as described herein may find use in systems where they work in conjunction with a separate power source such as an internal combustion engine or an AC source from the grid. In such systems, the batteries are called upon to repeatedly perform a particular function or functions. In performing these functions, the batteries discharge to varying degrees. The systems are designed so that the batteries' states of charge are automatically maintained at high levels to permit the batteries to reliably perform their functions when called upon. In certain embodiments, the batteries are recharged during opportunities when a separate power source (e.g., an internal combustion engine) becomes available to charge them.

Battery charge maintenance may be accomplished using a Battery Management Unit (BMU) or other appropriate controller. A BMU may include sensors or inputs for receiving sensed signals indicating one or more relevant parameters concerning the batteries under its control. Such parameters include the batteries' states of charge, temperature, voltage currently delivered by the batteries, coulombs passed after a triggering event, etc. The BMU may also include control logic dictating when and to what degree its batteries are to be charged or discharged.

In various embodiments, the batteries are charged in two or more different modes. In a first mode, termed a full charge operational mode, the batteries are fully charged from a discharged state to a state of charge that is considered fully charged for the type of battery (e.g., 2.3 V per cell for lead acid batteries and 1.93 V per cell for nickel zinc batteries). In another mode, termed a float charge operational mode, the batteries that have been fully charged are maintained at a float level (e.g., 1.87 V per cell for nickel zinc batteries). In the float mode, the batteries can be viewed as fully charged but they are maintained at a lower voltage. Float charging may compensate for self-discharge or small load discharging (i.e., charging in which the state of charge remains relatively high). Float charging typically involves trickling some charge into the batteries during normal operation of the system in which the batteries are used.

Conventionally, float charging serves to maintain the batteries in a fully charged state. Some conventional battery management units may be said to employ full charge and float charge as different operational modes, but in each mode, these BMUs charge the batteries to the same full state of charge. In some implementations described herein, the full charge mode is used when charging the batteries from a relatively deeply discharged state and float charge is used to maintain the batteries in a relatively highly charged state but at a level lower than that of fully charged batteries (e.g., about 95% of full charge). In other words, the float charge mode is used to maintain the batteries in a nearly fully charged state, so that the batteries are available to cold crank an engine, power a UPS or take other action where they may be discharged to a significant degree. In some implementations, the batteries are fully charged to a set full charge voltage level and then the charge voltage level is backed off to a float charge level. This approach promotes long life without excessive overcharge.

In accordance with various embodiments described herein, a special float charge mode is used for batteries in which continuous or repeated charging to full charge will damage the batteries, possibly by producing gases (e.g., hydrogen and/or oxygen) more rapidly than these can be recombined internally or safely vented. Aqueous nickel-zinc batteries are examples of batteries that can profit from this dual mode charging strategy. Other batteries that can similarly profit include silver-zinc, and nickel-metal hydride batteries. For convenience, nickel zinc batteries will be described herein as the batteries used in the disclosed dual mode systems. However, it should be understood that other battery systems may be used with the disclosed embodiments.

Various applications may benefit from the embodiments disclosed herein. Two applications requiring careful maintenance of battery pack charge are stationary backup storage (e.g., uninterruptible power supply or UPS) and micro-hybrid automotive or other vehicle electronic systems. In various micro-hybrid applications, the battery pack is called upon to deliver about 12-48V. UPS batteries generally provide a higher voltage. Both applications require the accurate determination and maintenance of the state of charge of the battery so that performance and life are maximized.

Various sensors and sensing techniques may be employed to determine state of charge and other battery conditions. In some embodiments, the state of charge is determined by counting charge in and charge out with periodic calibration to full charge or discharge. In some systems, DC impedance is monitored as a means of gauging the aging and deterioration of cell performance in a battery pack.

While the embodiments described herein typically refer to battery packs, it should be understood that much of the disclosure applies as well to single batteries that have their states of charge controlled as described. A battery pack may be understood to be a set of any number of (typically) identical batteries or individual battery cells. They may be configured in a series, parallel or a mixture of both to deliver the desired voltage, capacity, or power density. Components of battery packs include the individual batteries or cells, and the interconnects which provide electrical connectivity between them. Rechargeable battery packs may also contain a temperature sensor and/or voltage sensor, which the battery charger uses to detect the end of charging. Battery controllers are used to keep the voltage of the entire pack within defined levels.

System Components of a UPS

FIG. 1A presents a block diagram of an uninterruptible power supply integrated with a load. As shown in the figure, an AC power source 103 normally provides the power for a power supply 105 designed to provide power as needed for one or more loads 107. Examples of such loads include critical data processing and telecommunications equipment. Power supply 105 is designed or configured to provide electrical power at appropriate levels of current and voltage for the driven loads. Power source 103 is the primary power source for the loads, which means that in normal operation, the loads 105 receive all their power from source 103. The power source may be an electrical utility (the power grid), a generator, etc.

In the event that AC power source 103 becomes unavailable through an unexpected (or expected) event, a battery backup power pack 109 takes the place of power source 103 and makes power available to loads 107 immediately or shortly after power source 103 becomes unavailable. In some implementations, a diode is provided in the circuit between the batteries and the power line. Backup batteries 109 are connected to a battery charger 111 which is configured to deliver charge the batteries when they discharge. Typically, charging occurs after the power source 103 comes back up and can serve its role as primary power source for supply 105 and ultimately loads 107. When source 103 is available, a fraction of its electrical power may be made available to battery charger 111 to recharge backup batteries 109 to a full or float state, as appropriate.

Battery management logic is incorporated in the system, typically either as a separate unit or within power supply 105. The battery management logic ensures that the power supply fast charges to full charge then switches to float.

System Components of a Micro-Hybrid Vehicle

Figure 1B:
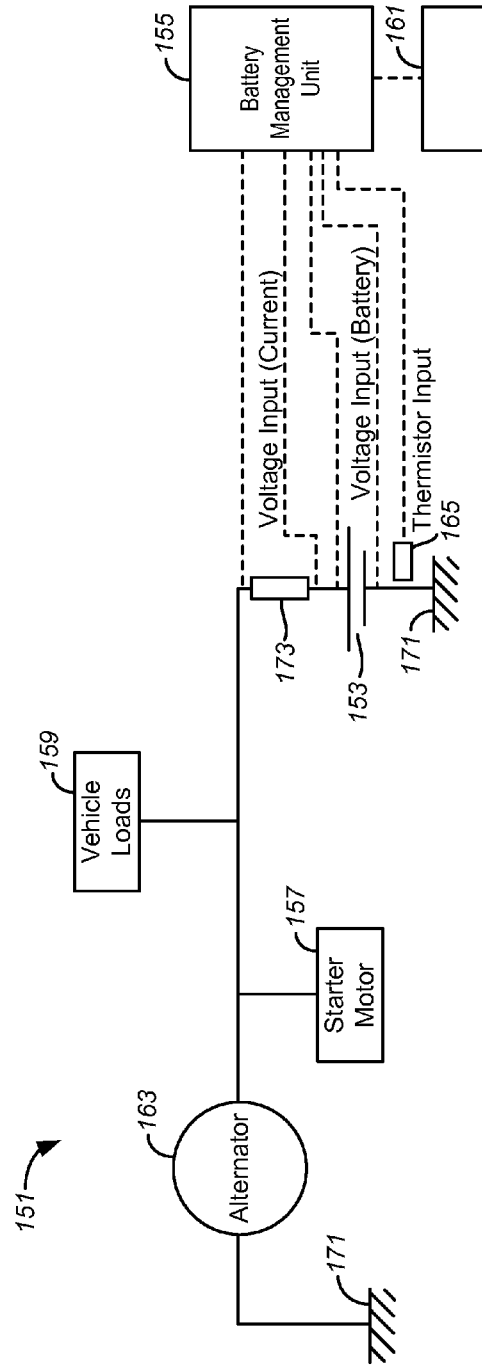
FIG. 1B is a block diagram of a vehicle having an electrical system with a battery pack and a BMU for providing electrical power to an electric starter motor and other electric loads in the vehicle.

FIG. 1B presents a block diagram of a vehicle having an electrical system 151 with a battery pack 153 and a BMU 155 for providing electrical power to an electric starter motor 157 and other electric loads 159 in the vehicle. In certain embodiments, the vehicle is a hybrid or micro-hybrid vehicle. A hybrid vehicle generally has a full electric drive capable of propelling the car. A micro-hybrid does not. The micro-hybrid is a sub set of the full hybrid. That is it incorporates start stop and may be capable of capturing regenerative braking energy and using the batteries in a cycling mode (when, after charging, the batteries discharge to support cabin loads) to improve fuel efficiency.

The BMU 155 and/or an engine control unit (ECU) 161 control aspects of the vehicle's electrical system. Of particular relevance these units may control the battery pack 153 as it operates in discharge mode, full charge mode, and float charge mode.

The starter motor 157 and an alternator 163 are in mechanical communication with an internal combustion engine (not shown). Both the batteries and the alternator are connected to ground 171, which may be the chassis of vehicle 151. The alternator 163 charges the batteries of pack 153 while the engine is running. It may charge the batteries in a full charge mode or float mode as specified by BMU 155 and/or ECU 161. The alternator 163 may also power the vehicle loads 159 when the engine is running. However, under some circumstances, the battery pack 153 may power some or all of the loads 159 while the engine is running. In certain embodiments, the alternator is a digitally controlled alternator.

As mentioned, the batteries in a micro-hybrid or other vehicle can be used, for example, to assist in propelling the vehicle, cold cranking an internal combustion engine in the vehicle, and/or powering electronic functionality to the cabin (e.g., radio, lights, seat warming, electric power steering, the navigation system, etc.). This functionality is represented collectively by the vehicle loads block 159. Cold cranking is conducted by having battery pack 153 power the starter motor 157, which is an electric motor for rotating an internal combustion engine so as to initiate the engine's operation under its own power. It is powered by high current and high voltage from the battery pack.

The BMU 155 takes as input the voltage and temperature from the battery pack 153. In the depicted embodiment, temperature is provided a thermistor 165. As explained in more detail elsewhere, the BMU 155 alone, or in conjunction with the ECU 161, determines whether to charge the batteries of pack 153, and, if so, whether to fully charge them or float charge them. It makes this decision using, inter alia, the current voltage of the battery pack, the temperature of the battery pack, and the amount of current (or charge) that has passed from the battery pack since it was last charged. A block 173 provides an input proportional to the current into and out of the batteries. It may be used for state of charge estimation, for impedance measurement and/or to monitor charging.

In certain embodiments, the BMU communicates with the ECU over a "LIN Bus", which is a serial single line communications protocol specifically developed by automobile makers to create a low cost, although relatively slow, network. The ECU may monitor the state of the engine (off/on), the engagement of gears and clutch etc. This and/or other information may be used to assess the intention of the driver. The ECU controls whether the engine turns off. It checks all the battery parameters and whether any of the interlocks are active. For instance, it checks to determine whether the seat belts are fastened or the hood latch is not engaged. These types of switches are an indicator of someone not in the vehicle or perhaps under the hood—a situation where the ECU would not turn the engine on if the batteries' state of charge is low. If the interlock condition does not forbid turning the engine on and the batteries are below a threshold state of charge, the ECU may direct the engine to stay on to charge the batteries.

In accordance with certain embodiments, logic and associated hardware is designed or configured to apply different battery charge voltages for the charge and float modes. As mentioned, a BMU and/or ECU may provide some such logic. In a micro-hybrid vehicle, the hardware may additionally include a digitally controlled alternator which can be instructed to charge the nickel-zinc batteries to a first voltage when in charge mode and to a second, lower, voltage when in float mode. In certain embodiments, the alternator has at least the following three operating modes: disabled, battery charge mode and battery float mode. For UPS applications, a DC-DC converter and associated power supply can accomplish the same result. A switch may also be employed.

In specific circumstances where the alternator imposes an excessive load on the engine it may be advantageous to deactivate the alternator and allow the battery to maintain vehicle loads until engine can again handle the vehicles electrical loads without excessive effort. When the batteries take responsibility for powering electrical loads while the engine is running, the engine may be required to reassume this responsibility if the batteries' state of charge drops below pre-set levels. Eventually, the engine will have to recharge the batteries, ideally when there is minimal load on the engine.

The alternator is typically sized based on the loads supported in the vehicle. For example, an alternator may be designed to provide 50-200 A depending on features—heated seats etc. Even on small cars like such as a 2012 Ford Focus™ an alternator may need to be capable of delivering 150 A so it seems to be sized to output enough current to support all loads and charge the battery after cranking. This figure will increase as the electrical features are added that support more micro hybrid features like electric power steering. However the battery cycling operation will mean that there will be additional charge requirements. In some cases, the batteries must be able to accept charge at 200 A so that we can absorb energy from the regenerative braking operation.

It should be noted that FIG. 1B shows only one battery pack (pack 153). In embodiments such as the one depicted, only a single nickel-zinc battery pack is used. It provides power to cabin electronics and to the engine starting system. This should be contrasted with designs where two different battery systems are used: e.g., a lithium ion battery for powering the cabin electronics and a lead acid battery to crank the internal combustion engine. While various implementations of the systems described herein employ only a nickel zinc battery pack to provide all battery functions, certain embodiments employ a nickel-zinc battery pack to power only the vehicle loads or to cold crank the engine, and a separate battery pack is employed for the other application.

For example, a nickel zinc battery pack may be employed for cabin loads and another battery pack used for cold cranking. In a specific embodiment, a 48 volt system uses two batteries, a 12V one coupled with a 48V one. The latter is used to support cabin loads and help with charge acceptance. The capacity of such battery may be about 10-20 Ah and can be satisfied by nickel-zinc battery pack which may contain cylindrical or prismatic cells.

In some embodiments, the BMU, ECU, digitally controlled alternator, and/or other components of a control system (collectively a controller) includes a processor, chip, card, or board, or a combination of these, which includes logic for performing one or more control functions. Some functions of the controller may be combined in a single chip, for example, an Application Specific Integrated Circuit (ASIC), a programmable logic device (PLD) chip or field programmable gate array (FPGA), or similar logic. Such integrated circuits can combine logic, control, monitoring, and/or charging functions in a single programmable chip.

In general, the logic used to control battery charge and discharge transitions can be designed or configured in hardware and/or software. In other words, the instructions for controlling the charge and discharge circuitry may be hard coded or provided as software. In may be said that the instructions are provided by "programming". Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the batteries and loads are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

In embodiments where the battery or battery pack is to be charged at two distinct levels, a full charge state and a lower float charge state, the controller logic can be designed or configured to determine which charge state is appropriate under the circumstances (engine state, battery SOC, etc.) and direct charging to the level associated with the determined charge state.

Charging at High Rates and to Float Voltage

Currently engine control units are designed to make decisions about battery and engine usage based on parameters ECUs receive from BMUs. The ECUs and/or BMUs make these decisions as appropriate for lead acid batteries. Lead acid batteries, however, have different requirements than nickel-zinc and certain other batteries. Lead acid batteries are slow to recharge and suffer from poor charge acceptance if they are discharged below relatively modest states of charge.

When lead acid batteries are used in stationary storage (e.g., UPS applications), both re-charging and floating is normally performed to a specific voltage around 2.3V per cell. The voltage is maintained on the battery so that the full state of charge is available when the main power source is disrupted. This is appropriate as lead acid batteries are quite slow to recharge. They normally take several hours to recharge even at high voltages of 2.5V per cell. For backup applications, however, long time periods are typically available to recharge lead acid batteries after they serve their roles as backup power sources. Therefore, the low recharge rate associated with charging at 2.3V is tolerable.

The normal operation of lead batteries in micro-hybrid and other vehicles involves charging and floating at a fixed voltage between 13.8 and 14.8V. A typical BMU algorithm charges to 14.4V and then trickles the charge to it in an attempt to maintain 14.4 V during normal operation. This charge trickle is the float charge.

When the vehicle is stopped, the battery pack sustains the automotive electrical functions, but after re-start the battery must be recharged. If the next stop occurs before the optimum state of charge is achieved, then the state of charge of the batteries may decrease until they are no longer able to crank the engine. Before this condition can occur, the vehicle's stop start functionality must be disabled to allow the battery to regain an acceptable state of charge. In other words, the vehicle's internal combustion engine must continue running in situations where the stop start algorithm might otherwise require that the engine stop running. Such situations may include stops in traffic and coasting. The running engine is necessary to charge the batteries. It would be advantageous to employ batteries having a rapid charge capability so that the stop start functionality can continue to be utilized more fully. Nickel-zinc batteries are one type of battery that can charge much faster than lead acid batteries, thereby allowing the engine to stop more frequently.

Another issue encountered in both stationary and vehicle application is the potential for low charge acceptance with lead acid batteries. Both applications may drive a lead acid battery to low states of charge. If the battery remains in such state for any significant time, its lead electrodes may form lead sulfate, which decreases the battery's future ability to accept charge.

In many ways, the nickel zinc aqueous battery compares favorably to the lead acid battery and may replace lead acid in some cases.

1. The nickel zinc battery recharges faster recharge than lead-acid. A typical nickel-zinc battery pack for UPS applications can be charged from 0-100% state of charge (to 1.9 volts) in 2 hours. By contrast, a comparable lead acid battery requires 8-10 hours to charge.

2. The battery does not degrade at low states of charge. A nickel-zinc battery can operate at 40-50% of its fully charge state without having its performance degrade. It can reliably crank the engine at these low states of charge.

3. The battery can be used in a vehicle to both crank the engine and to power the cabin electronics. A single nickel-zinc battery pack can serve both purposes.

4. The battery performs well over a wide temperature range, e.g., about 5 to 60° C.

A nickel-zinc battery can be fully recharged in 2 hours or less from a fully discharged state when the voltage of a constant current-constant voltage charge procedure is maintained between about 1.9-1.93V per unit cell. Unfortunately, at this voltage, the steady state current at full charge may shorten the lifetime of the cell as a result of the rate of generation of gas exceeding the rate of recombination of the gas with consequent gas escape through the re-sealable vent. This is a consequence of the use of a robust separator that inhibits the transport of gases from one electrode to the other. More specifically the separator inhibits the transport of oxygen from the positive electrode to the negative electrode. In various embodiments, the separator is a polyolefin microporous separator. The separator is typically used to prevent zinc dendrite penetration into the positive electrode. Examples of nickel zinc batteries are described in U.S. patent application Ser. No. 11/116,113, filed Apr. 26, 2005; U.S. patent application Ser. No. 11/346,861 (Now U.S. Pat. No. 7,550,230), filed Feb. 1, 2006; and U.S. patent application Ser. No. 13/549,322, filed Jul. 13, 2012.

In various embodiments, a battery pack containing nickel zinc batteries or other batteries similarly susceptible to gassing during normal high rate charging is operated in a manner that both supports both high rate charging and float charging to maintain the batteries in a high state of charge. The float charging is performed to a fixed voltage level (or state of charge level) which is below a separately defined full charge level. When in full charge mode, the batteries are charged to the full charge level and when they are in float charge mode, they are charged only to the lower float level. The float level may be chosen to avoid problems with the batteries that may occur if they are repeatedly or continuously charged to the full charge level, particularly at high rates. As mentioned, one of these problems is gassing at a faster rate than recombination.

For example, a nickel zinc battery under charge may produce hydrogen at the zinc electrode and oxygen at the nickel electrode. At the full charge level, the rate of production of these gases exceeds the rate at which they can recombine in the cell. At the float charge level, the rate of production is approximately the same as (or less than) the rate at which they can recombine. The full and float charge levels are typically a function of temperature and they may also be a function of the charge rate.

Certain parameters associated with the dual mode (different float charge and full charge) for a nickel zinc battery will be set forth below. These parameters include the fixed voltage level for full charge and the different fixed voltage level for float charge. Suitable charge rates for full charge and float charge are also pertinent.

ECU/BMU Operation

As mentioned, the logic for controlling the modes of battery operation in a vehicle is typically implemented in a BMU, an ECU, and/or a digitally controlled alternator. In certain embodiments, the control system provides both fast charge and a float charge mode accomplished at a relatively low voltage level. In certain embodiments, the BMU monitors the state of charge of nickel zinc battery and reports the status via a communication link to the vehicle's ECU. The ECU can then make appropriate decisions as to whether to use the batteries or alternator to power the vehicle's electrical load. In this context, the ECU may determine whether to change the charge voltage or disable a digitally controlled alternator, for example.

In some implementations, a BMU provides information about a nickel zinc battery pack to the vehicle's Engine Control Unit, which decides, among other things, (1) whether to deliver charge to the battery pack from the alternator, and (2) whether the motor can stop. Decision 2 is based on the state of charge of the batteries in the pack. Basically, the batteries must be sufficiently charged to restart the motor after the car is stopped. Decision 1 is made while the vehicle is running and the battery charge state is determined to be low enough to require further charging. Depending on the circumstances, the further charging can be either float charging or full recharging.

In certain embodiments, the micro-hybrid vehicle battery pack and associated BMU will have at least three operational states or modes: discharge, charge to full charge, and float charge.

In the discharge mode, nickel-zinc batteries may discharge to a point where full charge is needed when batteries drive vehicle loads while the internal combustion engine is not operating. Examples include using the batteries to cold crank the internal combustion engine and powering cabin accessories while the engine is off (e.g., the engine is shut down during coasting).

Conditions that trigger full charge of micro-hybrid Ni—Zn batteries include turning on the internal combustion engine—and engaging the alternator—after the batteries have reached a low state of charge. Conditions that will result in float charging of micro-hybrid Ni—Zn batteries include running the internal combustion engine while the alternator powers cabin accessories. Typically, the batteries will be in a relatively high state of charge when float charge is applied. When the batteries are at a relatively lower state of charge, full charge may be applied. In some cases, the ECU determines whether to apply full charge of float charge. In addition to considering the batteries' state of charge, the ECU may consider whether the engine is accelerating of decelerating. Acceleration may result in less current being delivered by the alternator. Thus, a hard acceleration may result in disabling the alternator or in float charging if the batteries are in a relatively low state of charge. Typically, float charge does not require a high current draw.

However, when the internal combustion engine is operating near peak capacity, e.g., during acceleration or uphill climbing, the system may either float charge the battery and have the alternator power accessories or disable the alternator and have the battery power the accessories. The latter option may be preferable if the battery is fully charged or at an acceptable state of charge. In other conditions where the vehicle engine is not working as hard (light acceleration or slight incline) then the float charge option may be preferable. This allows the battery to be ready for the opportunity to shut down the engine during coast. This provides a significant opportunity for fuel savings.

As mentioned, the nickel-zinc battery is able to charge relatively rapidly and thereby maintain an appropriate state of charge for the various vehicle functions it is asked to undertake. Further, the nickel-zinc battery has a wide range of states of charge suitable for starting a car. This is useful in extreme traffic conditions, where the battery is frequently called on to power vehicle loads.

In some embodiments, float charging is conducted at less than the optimal float charge states until the engine stress decreases to a level permitting full charge to be achieved.

Table 1 presents a state diagram in accordance with certain implementations of the disclosed vehicle control system. The states (modes of battery operation) are determined as a function of the engine's level of exertion of the nickel zinc battery's state of charge. The state of charge may be determined during or in advance of a discharge operation (e.g., cold cranking or driving cabin electronics) or after polling by the BMU. In certain embodiments, a high state of charge may be at least about 70%, a low state of charge may be at most about 40%, and an intermediate state of charge is state in between the high and low states of charge. In certain embodiments, an engine running at high stress is an engine operating at a significant fraction of its maximum capacity (e.g., maximum power or rotations per minute).

TABLE 1

|  | High SOC | Intermediate SOC | Low SOC |
| --- | --- | --- | --- |
| Engine Running (low stress) | Float Charge Mode | Float Charge Mode | Full Charge Mode |
| Engine Running (high stress) | Discharge Mode | Discharge Mode | Full Charge Mode |
| Engine not Running | Discharge Mode | Discharge Mode | NA |

In a sample implementation, the BMU or other battery control logic initially determines that the nickel zinc batteries in a battery pack have dropped to an intermediate state of charge (e.g., 60%). The BMU informs the ECU of the state of charge and the ECU then makes a decision regarding whether to charge the batteries and if so to which state. Alternatively, the BMU itself determines that the batteries should be charged and optionally determines the level of charge and informs the ECU. The ECU takes into account the condition of the engine and determines whether to charge the batteries to the designated level (float). If the decision is made to charge the batteries, the ECU directs the alternator to provide charge at an appropriate level (full or float level) to the nickel zinc batteries. As explained, a digitally controlled alternator may be used for this purpose. Of course, other mechanisms may be employed to control the charge to the battery pack. The alternator may also power cabin accessories while the nickel zinc batteries are in float mode, or in full charge mode for that matter.

In certain embodiments, the BMU determines when the battery is fully charged by monitoring the current level in a constant voltage phase or by tracking the net charge input. When the battery is determined to be fully charged the applied charge voltage is lowered to the designated float voltage for the prevailing temperature. For example, a 7 cell "12 Volt" battery pack can absorb charge currents in excess of 5 C (200 Amp on a 40 Ah battery). Once the target state of charge is achieved the battery can be floated at a lower voltage (1.82-1.87V at room temperature) to maintain the state of charge while the alternator simultaneously supports the electronic loads of the car. Full charge would be implemented again after a discharge event that lowered the batteries' state of charge to a level requiring full recharge. Using two voltage levels in this way makes it possible to optimize both the fast charge and the service life of the battery. The system therefore is ready to service multiple vehicle loads or handle multiple power outages occurring in rapid succession.

Figure 2:
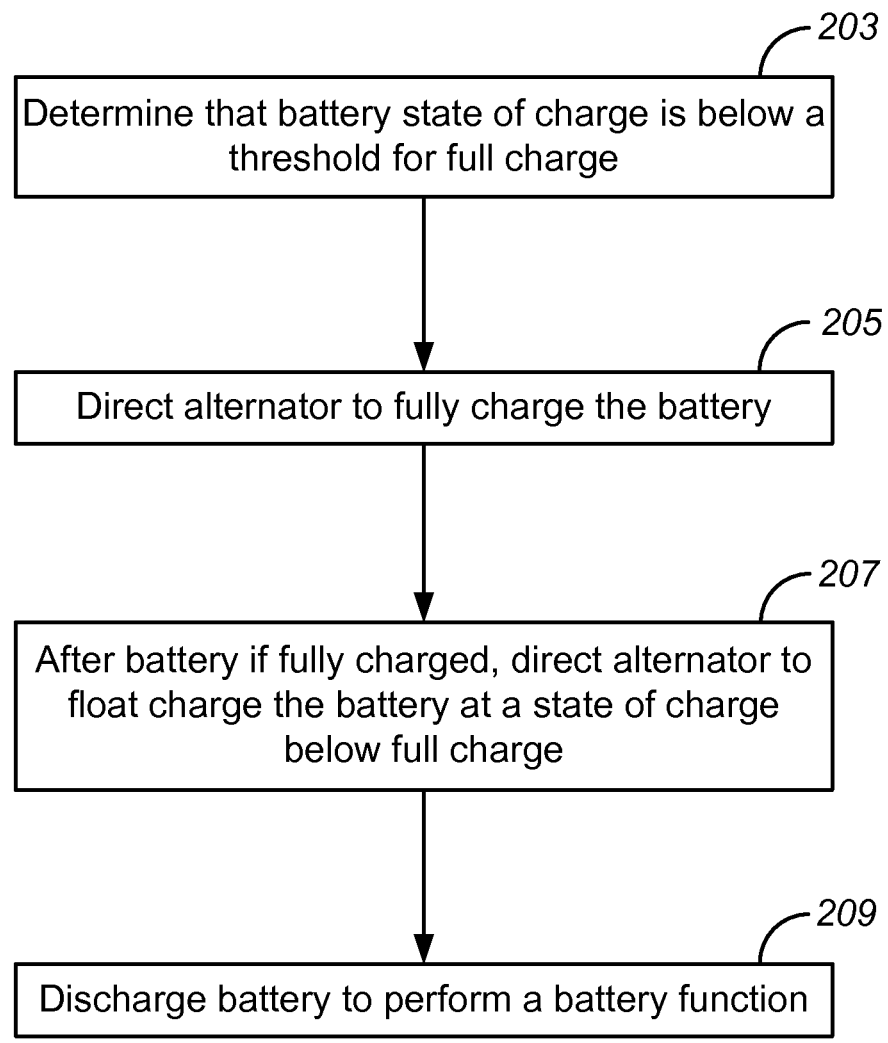
FIG. 2 is a flow chart depicting a process for controlling the state of charge in a battery at full charge and float charge.

An example process flow is depicted in FIG. 2. Initially, the BMU or other monitoring element determines that the battery state of charge is below a threshold associated with full charge mode. Block 203. Then, the controller directs the alternator to fully charge the battery. Block 205. Thereafter, when the battery is fully charged, the controller directs the alternator to float charge the battery to a state of charge below that of the full charge. Block 207. In the manner, the battery is likely to be ready to discharge and perform its function reliably.

Table 1 indicates that when the engine is not running, the battery should not be in a low charge state (indicated by NA in the table). However, in certain implementations, there is an option in which when the engine is not running but while it is in an operating mode (e.g., the key is in the ignition and turned on) and the battery is at low state of charge the system presents the option of turning the engine on to raise the battery's state of charge.

In a typical implementation, the BMU continuously or frequently monitors the batteries current or other property to allow rapid adjustment of the state of charge. In some cases, the adjustments are performed on the order of milliseconds or faster. In some embodiments, the BMU polls or otherwise determines the state of charge on a schedule.

UPS Operation

In certain embodiments, the UPS battery pack and associated BMU will have at least three operational states or modes: discharge, charge full charge, and float charge. In discharge mode, the UPS nickel-zinc batteries are discharged to a point where full charge is needed. In this mode, the batteries may be discharged to provide power while the normal power source (e.g., an AC power source as shown in FIG. 1A) is down and unavailable to immediately recharge the batteries. Conditions that will trigger full charging of UPS nickel-zinc batteries include bringing the primary power source back on line after the nickel-zinc batteries have discharged to power the load while the primary source was down. A condition that will result in float charging UPS nickel-zinc batteries include maintaining the batteries state of charge at nearly 100% after the batteries have been brought to full charge. In some implementations for UPS applications, float charging is used to keep the battery at full charge and compensate for self-discharge.

In certain embodiments employing nickel zinc batteries, the system switches the charger in and out when the battery voltage drops to a level that might indicate 90-95% state of charge. This hysteresis charging means that the initial state of charge can vary between 90-100% when a power outage occurs.

Parameters

1. SOC and Voltages for Fully Charged and Float Ni—Zn Cells

As mentioned, in order to maintain full charge over an extended service life, the float voltage applied to nickel-zinc batteries may, in certain embodiments, be between about 1.8-1.9V over a range of temperatures centered on room temperature. The full charge voltage may be between about 1.8 and 1.95V over the range of temperatures.

The full charge level may be a function of temperature. In one implementation, the charge level is determined by the following expression:

$$V=1.9-0.002*(T-22)$$

where T is in degrees Centigrade. Basically 2 mV change per cell per degree centigrade. For a 7 cell battery this would be 14 mV per degree Centigrade.

In certain embodiments, the float voltage is also determined as an inverse function of temperature. However, the float charge voltage may be less sensitive to temperature than the full charge voltage.

2. Charge Rates

For micro-hybrid applications, the charge rate for batteries may be up to about 5 C in certain embodiments. Typically, the range may be about 1 C to 5 C. As an example, in operation, while driving typical vehicle loads, such as vehicle lights, radio, and fan, a 40 Ah cell may discharge by about 2% (e.g., from about 80% to 78% state of charge). This represents, e.g., about a 1 minute stop at 45 A discharge levels. The state of charge of this or similar discharges can be recovered by recharging at 100 A for about 30 seconds or less.

Of course, charging conducted at a fixed voltage will dictate the current drawn to the batteries, and hence the charge rate, at least at the end of a charge program where voltage control applies. At 1 C the time at room temperature to 80% SOC (32 Ah) from 0% SOC is approximately 48 minutes before the current drops due to the charge voltage limitation (e.g., 1.9V). For a float charge at, e.g., 1.85V or lower, the current will fall off at below 50% SOC so the input current may be the same (as for full charge mode) but for a much shorter time. After it hits the voltage limit the current will fall off more rapidly to a lower value than would be observed at the 1.9V cap. It is this lower steady state value that prevents any damage to the batteries during float.

Description of Nickel Zinc Batteries

The Positive Electrode

The nickel hydroxide electrode has been used as the positive electrode in high power and high energy nickel-metal hydride batteries, nickel-cadmium batteries and nickel-zinc batteries. The nickel positive electrode generally includes electrochemically active nickel oxide or hydroxide or oxyhydroxide and one or more additives to facilitate manufacturing, electron transport, wetting, mechanical properties, etc. For example, a positive electrode formulation may include nickel hydroxide particles, zinc oxide, cobalt oxide (CoO), cobalt metal, nickel metal, and a thixotropic agent such as carboxymethyl cellulose (CMC). Note that the metallic nickel and cobalt may be provided as chemically pure metals or alloys thereof. The positive electrode may be made from paste containing these materials and a binder such as a polymeric fluorocarbon (e.g., Teflon™).

In certain embodiments, the nickel hydroxide electrode includes nickel hydroxide (and/or nickel oxyhydroxide), cobalt/cobalt compound powder, nickel powder and binding materials. The cobalt compound is included to increase the conductivity of the nickel electrode. In one embodiment, the nickel positive electrode includes at least one of cobalt oxide, cobalt hydroxide, and/or cobalt oxyhydroxide; optionally coated on nickel hydroxide (or oxyhydroxide) particles.

A nickel foam matrix may be used to support the electroactive nickel oxide (e.g., $Ni(OH)_2$) electrode material. The foam substrate thickness may be may be between 15 and 60 mils. The thickness of the positive electrode, which includes nickel foam filled with the electrochemically active and other electrode materials, ranges from about 16-24 mils, preferably about 20 mils thick. In one embodiment, a nickel foam density of about 350 $g/m^2$ and thickness ranging from about 16-18 mils is used.

In certain embodiments, the batteries include a non-nickel positive electrode (e.g., a silver or air electrode). The silver-zinc system employs silver-oxide as the positive electrode, while the zinc-air system employs a gas-diffusion electrode containing catalysis for oxygen reduction-production.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator includes at least two layers (and in some cases exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting (or wicking) layer may be made of any suitable wettable separator material. Typically the wetting layer has a relatively high porosity e.g., between about 50 and 85% porosity. Examples include polyamide materials such as nylon-based as well as wettable polyethylene, polypropylene and cellulose-based materials. One particular material is cellulose impregnated and/or coated with polyvinylalcohol. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable. Embodiments are directed toward selectively sealing separators. Virtually any separator material will work so long as it can be sealed via application of one of the heat sources described herein. In some embodiments, separator materials of differing melting points are employed, in other embodiments separators that seal are employed in conjunction with those that do not seal under the conditions to which one or both ends of the jellyroll are exposed.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, enveloping the negative electrode in a separator layer will aid in preventing dendrite formation. Specific heat sealing embodiments are described in more detail below in relation to the section entitled, "Electrodes and Separator Assembly—The Jellyroll."

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (e.g., potassium borate, potassium metaborate, sodium borate, sodium metaborate, and/or a sodium or potassium phosphate). In one specific embodiment, the electrolyte includes about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications includes about 8.5 equiv/liter of hydroxide, about 4.5 equivalents of boric acid and about 0.2 equivalents of potassium fluoride.

Embodiments are not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may include a liquid and a gel. The gel electrolyte may include a thickening agent such as CARBOPOL™ available from Noveon of Cleveland, Ohio. In a preferred embodiment, a fraction of the active electrolyte material is in gel form. In a specific embodiment, about 5-25% by weight of the electrolyte is provided as gel and the gel component includes about 1-2% by weight CARBOPOL™.

In some cases, the electrolyte may contain a relatively high concentration of phosphate ion as discussed in U.S. Pat. No. 7,550,230, entitled "Electrolyte Composition for Nickel Zinc Batteries," filed Feb. 1, 2006, by J. Phillips and S. Mohanta, which is incorporated herein by reference for all purposes.

In certain embodiments, the nickel zinc battery used in the disclosed embodiments is configured to operate in an electrolyte "starved" condition. Such cells have relatively low quantities electrolyte in relation to the amount of active electrode material. They can be easily distinguished from flooded cells, which have free liquid electrolyte in interior regions of the cell. Starved format cells are discussed in U.S. patent application Ser. No. 11/116,113, filed Apr. 26, 2005, titled "Nickel Zinc Battery Design," published as US 2006-0240317 A1, which is hereby incorporated by reference for all purposes. It may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The Negative Electrode

As applied to nickel-zinc cells, the negative electrode includes one or more electroactive sources of zinc or zincate ions optionally in combination with one or more additional materials such as surfactant-coated particles, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may include one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide.

Active material for a negative electrode of a rechargeable zinc alkaline electrochemical cell may include zinc metal (or zinc alloy) particles. If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada. In one embodiment, the electrochemically active zinc metal component of nickel zinc cells contains less than about 0.05% by weight of lead. Tin may also be used in the zinc negative electrode.

In certain embodiments, the zinc metal particles may be coated with tin and/or lead. The zinc particles may be coated by adding lead and tin salts to a mixture containing zinc particles, a thickening agent and water. The zinc metal can be coated while in the presence of zinc oxide and other constituents of the electrode. A zinc electrode containing lead or tin coated zinc particles is generally less prone to gassing when cobalt is present in the electrolyte. The cycle life and shelf life of the cells is also enhanced, as the zinc conductive matrix remains intact and shelf discharge is reduced. Exemplary active material compositions suitable for negative electrodes of this invention are further described in U.S. patent application Ser. No. 12/467,993, entitled "Pasted Zinc Electrode for Rechargeable Nickel-Zinc Batteries," by J. Phillips et. al., filed May 18, 2009, which is hereby incorporated by reference for all purposes.

The zinc active material may exist in the form of a powder, a granular composition, fibers, etc. Preferably, each of the components employed in a zinc electrode paste formulation has a relatively small particle size. This is to reduce the likelihood that a particle may penetrate or otherwise damage the separator between the positive and negative electrodes.

Considering the electrochemically active zinc components in particular (and other particulate electrode components as well), such components preferably have a particle size that is no greater than about 40 or 50 micrometers. In one embodiment the particle size is less than about 40 microns, i.e. the average diameter is less than about 40 microns. This size regime includes lead coated zinc or zinc oxide particles. In certain embodiments, the material may be characterized as having no more than about 1% of its particles with a principal dimension (e.g., diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc.

Various organic materials may be added to the negative electrode for the purpose of binding, dispersion, and/or as surrogates for separators. Examples include hydroxyethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Conductive fibers added to the negative electrode may also serve the purpose of irrigating or wetting the electrode. Surfactant coated carbon fibers are one example of such material. However, it should be understood that other materials may be included to facilitate wetting. Examples of such materials include titanium oxides, alumina, silica, alumina and silica together, etc. Generally, when present, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Zinc negative electrodes contain materials that establish conductive communication between the electrochemically active component of the zinc negative electrode and the nickel positive electrode. The inventors have found that introduction of surfactant-coated particles into the negative electrode increases the overall current carrying capability of the electrode, particularly surfactant coated carbon particles, as described in U.S. patent application Ser. No. 12/852,345, filed Aug. 6, 2010, titled, "Carbon Fiber Zinc Negative Electrode," by Jeffrey Phillips, which is incorporated herein by reference for all purposes.

As mentioned, a slurry/paste having a stable viscosity and that is easy to work with during manufacture of the zinc electrode may be used to make the zinc negative electrode. Such slurry/pastes have zinc particles optionally coated by adding lead and tin salts to a mixture containing the zinc particles, a thickening agent and a liquid, e.g. water. Constituents such as zinc oxide (ZnO), bismuth oxide ($Bi_2O_3$), a dispersing agent, and a binding agent such as Teflon are also added. Binding agents suitable for this aspect include, but are not limited to, P.T.F.E., styrene butadiene rubber, polystyrene, and HEC. Dispersing agents suitable for this aspect include, but are not limited to, a soap, an organic dispersant, an ammonium salt dispersant, a wax dispersant. An example of commercially available dispersants in accord with this aspect of the invention is a Nopcosperse™ (trade name for a liquid series of dispersants available from Nopco Paper Technology Australia Pty. Ltd.). Liquids suitable for this aspect include, but are not limited to, water, alcohols, ethers and mixtures thereof.

Cell Construction

The disclosed methods and systems may be implemented with a wide range of nickel-zinc cell sizes and formats. For example, the embodiments presented herein may employ prismatic cell formats, as well as various larger format cylindrical cells employed for various non-portable applications. The capacity requirements for vehicle applications may dictate prismatic batteries. The requirements for UPS applications are sometimes lower, so cylindrical cells may be used in some cases.

In some embodiments, the interior of the cell container, or other structural component of the cell, may be coated with a material to aid hydrogen recombination. Any material that catalyzes hydrogen recombination may be used. An example of such a material is silver oxide.

Although the cell is generally sealed from the environment, the cell may be permitted to vent gases from the battery that are generated during charge and discharge. In some embodiments, a nickel zinc cell is designed to operate at this pressure and even higher (e.g., up to about 300 psi) without the need to vent. This may encourage recombination of any oxygen and hydrogen generated within the cell. In certain embodiments, the cell is constructed to maintain an internal pressure of up to about 450 psi and or even up to about 600 psi. In other embodiments, a nickel zinc cell is designed to vent gas at relatively lower pressures. This may be appropriate when the design encourages controlled release of hydrogen and/or oxygen gases without their recombination within the cell. Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

Example Implementation

In some micro-hybrid systems, the battery pack has 7 nickel-zinc batteries and in other micro-hybrid systems, the battery pack has 8 nickel-zinc batteries. Some example implementation details follow:

8 cell pack—Charge can go to 15.2 volts (higher at lower temperatures; e.g., up to 15.5 volts)—float to 13.8 volts (and up to 14.8 volts in some implementations), which is consistent with the voltage accepted for cabin electronics in many vehicle designs.

7 cell pack—charge to 13.5 volts (although higher voltages may be acceptable for short periods to allow 200 A inrush currents)—float to 12.95 volts.

Float voltages are optionally imposed by digitally controlled regulator.

Battery maintained between 75-85% state of charge 100-75 A recharge limited by the output voltage/current of the alternator Recharging the battery to 80% SOC in 4 seconds at 13V after 20 sec 15 A drain

| Electrical Characteristics | |
|---|---|
| Nominal Voltage | 1.65 V |
| Typical Capacity[1] | 40 Ah |
| Minimum Capacity[1] | 39 Ah |
| AC Impedance (1 kHz @ 100% SOC) | <0.6 mΩ |
| DC Internal Resistance (400 A × 10 s pulse @ 50% SOC) | <1.2 mΩ |
| Gravimetric Energy Density | 65 Wh/kg |
| Volumetric Energy Density | 125 Wh/l |
| Gravimetric Power Density | 860 W/kg |
| Volumetric Power Density | 1725 W/l |

[1] @ 25° C. using 1 C rate discharge and manufacturer recommended charge algorithm

| Operating Parameters | |
|---|---|
| Recommended Charging Algorithm @ 25° C. | 40 A CC to 1.9 V 1.9 V CV to 2 A |
| Recommended Charge Current (@25° C. to 1.9 V) | 40 A |
| Continuous Charge Current (@25° C. to 1.9 V) | 160 A |
| Max. Pulse Charge Current (<80% SOC, 10 s, <160 A Avg.) | 400 A |
| Recommended Discharge Voltage Limit | 1.1 V |
| Recommended Pulse Discharge Voltage Limit | 0.8 V |
| Recommended Discharge Current (@25° C. to 1.1 V) | up to 120 A |
| Max. Continuous Discharge Current (@25° C. to 1.1 V) | up to 400 A |
| Max. Pulse Discharge Current (30 s, @25° C. to 0.8 V) | 600 A |
| Operating Temperature | −30° C. to +65° C. |
| Recommended Charge Temperature | 0° C. to +40° C. |
| Recommended Storage Temperature (Short-Term) | −30° C. to +65° C. |
| Recommended Storage Temperature (Long-Term) | 0° C. to +40° C. |

Other Embodiments

In accordance with various embodiments, a system (e.g., a BMU) is provided for nickel zinc cells to allow such cells to serve one or more functions of a battery pack in a UPS or micro-hybrid vehicle. In some cases, the system works for both nickel zinc and lead acid cells, even though these cells have very different characteristics.

In some embodiments, this is accomplished by transmitting battery type-ID code to the ECU: one code for lead acid batteries and another code for nickel zinc batteries. The ECU may employ one algorithm for, e.g., nickel zinc batteries and a different algorithm for, e.g., lead acid batteries. In an alternative embodiment, the ECU employs a single algorithm for each of two more battery types. For example, the ECU has only an algorithm for lead acid batteries. In such cases, the BMU may need to adjust the battery parameters fed to the ECU. The BMU modifies certain operating characteristics of the nickel zinc parameters before handing them to the ECU. As an example, the nickel zinc battery may have a 40% state of charge, but BMU announces to the ECU that it has 60% state of charge. In this example, if a lead acid battery had a 40% SOC, the ECU would require that the engine not stop until the lead acid batteries were charged to 60% SOC. However, nickel zinc batteries serve their functions adequately at 40% SOC, so it would be improper for the ECU algorithm to make a battery charging decision based on 40% SOC for a nickel zinc battery, which the ECU does not understand.

In certain embodiments, the BMU is capable of modifying the voltage or current provided by the alternator to the batteries. This allows the BMU to protect the batteries from overcharge and other problems that could arise from the ECU's assumption that it is working with a different type of battery.

The foregoing describes the instant invention and its presently preferred embodiments. Numerous modifications and variations in the practice of this invention will occur to those skilled in the art. Such modifications and variations are encompassed within the following claims. The entire disclosures of all references cited herein are incorporated by reference for all purposes.

What is claimed is:

1. A method of controlling the state of charge of one or more aqueous nickel-zinc batteries in a battery pack for a system having (i) a separate power source working in conjunction with the battery pack, wherein the separate power source is an internal combustion engine, and (ii) a full charge mode and a float charge mode, the method comprising:
    (a) determining that a state of charge of the one or more aqueous nickel-zinc batteries in the battery pack is below a defined level associated with the full charge mode;
    (b) while in the full charge mode, applying charge to the battery pack at a first voltage to charge the one or more aqueous nickel-zinc batteries of the battery pack to a fully charged state, wherein the charge to the fully charged state is provided from the internal combustion engine; and
    (c) subsequently, while operating the system in the float charge mode, applying charge to the battery pack at a second voltage to maintain the one or more nickel-zinc batteries of the battery pack at a float charged state, wherein the charge to the float charge state is provided from the internal combustion engine, and wherein a magnitude of the second voltage is below a magnitude of the first voltage.

2. The method of claim 1, wherein the system is an electrical system of a vehicle.

3. The method of claim 2, further comprising, prior to (a), discharging the one or more nickel-zinc batteries in the battery pack below the defined level associated with the full charge mode, wherein the discharging is conducted to perform an electrical function for the vehicle.

4. The method of claim 3, wherein the electrical function comprises a function selected from the group consisting of cold cranking an internal combustion engine of the vehicle, powering cabin electronics of the vehicle, powering power steering of the vehicle, and a combination thereof.

5. The method of claim 3, further comprising, prior to (c) partially discharging the one or more aqueous nickel-zinc batteries in the battery pack to perform the electrical function for the vehicle.

6. The method of claim 1, further comprising
    determining the temperature of battery pack and/or or the one or more nickel-zinc batteries in the battery pack; and
    calculating the fully charged state as a function of temperature.

7. The method of claim 6, wherein calculating the fully charged state comprises evaluating the following expression: Voltage(fully charged)=1.9−0.002*(Temperature in Celsius-22).

8. The method of claim 1, further comprising: before (b), determining that the separate power source is operational.

9. The method of claim 1, wherein providing the charge from the separate power source to charge the one or more nickel-zinc batteries in the battery pack in a step selected from the group consisting of step (b), step (c), and both of steps (b) and (c), comprises providing power from the separate power source to an alternator electrically coupled to the battery pack.

10. The method of claim 1, wherein the battery pack contains exactly 3 batteries.

11. The method of claim 1, wherein the battery pack contains exactly 4 batteries.

12. The method of claim 1, wherein, the first voltage is between 1.82 and 1.95 volts.

13. The method of claim 1, wherein the second voltage is between 1.75 and 1.87 volts.

14. The method of claim 1, further comprising
    determining the temperature of battery pack or the one or more aqueous nickel-zinc batteries in the battery pack; and
    calculating the float charge state as a function of temperature.

15. The method of claim 1, wherein charging the one or more aqueous nickel-zinc batteries of the battery pack to the fully charged state in (b) is conducted at a rate of at least 1 C.

16. The method of claim 1, wherein charging the one or more aqueous nickel-zinc batteries of the battery pack to the float charge state in (c) is conducted at a rate of at least 1 C.

17. The method of claim 1, wherein the state of charge of the fully charged state is 100%.

18. The method of claim 1, wherein the state of charge of the fully charged state is 80%.

19. A controller for controlling a state of charge of one or more aqueous nickel-zinc batteries in a battery pack for a system having (a) a separate power source working in conjunction with the battery pack, wherein the separate power source is an internal combustion engine, and (b) a full charge mode and a float charge mode, the controller comprising:
    a communications interface for communicating with a part or parts selected from the group consisting of an alternator, an engine control unit, and both of the alternator and the engine control unit; and
    logic for
        (i) determining that the state of charge of the one or more aqueous nickel-zinc batteries in the battery pack is below a defined level associated with the full charge mode;
        (ii) while in the full charge mode, applying charge to the battery pack at a first voltage to charge the one or more aqueous nickel-zinc batteries of the battery pack to a fully charged state, wherein the charge to the fully charged state is provided from the internal combustion engine; and (iii) subsequently, while operating the system in the float charge mode, applying charge to the battery pack at a second voltage to maintain the one or more aqueous nickel-zinc batteries of the battery pack at a float charged state, wherein the charge to the float charge state is provided from the an internal combustion engine, and wherein a magnitude of the second voltage is below a magnitude of the first voltage.

20. The controller of claim 19, wherein the controller logic is further designed or configured for determining the temperature of battery pack or the one or more nickel-zinc batteries in the battery pack; and calculating the fully charged state as a function of temperature.

21. The controller of claim 20, wherein calculating the fully charged state comprises evaluating the following expression: Voltage(fully charged)=1.9−0.002*(Temperature in Celsius-22).

22. The controller of claim 19, wherein the controller logic is further designed or configured for determining, before (ii), that the separate power source is operational.

23. The controller of claim 19, wherein, the first voltage is between 1.87 and 1.95 volts.

24. The controller of claim 19, wherein, the second voltage is between 1.75 and 1.87 volts.

25. The controller of claim 19, wherein the controller logic is further designed or configured for determining the temperature of battery pack and/or or the one or more nickel-zinc batteries in the battery pack; and calculating the float charge state as a function of temperature.

26. The controller of claim 19, wherein the controller logic is further designed or configured for charging the one or more aqueous nickel-zinc batteries of the battery pack to the fully charged state in (ii) at a rate of at least 1 C.

27. The controller of claim 19, wherein the controller logic is further designed or configured for charging the one or more aqueous nickel-zinc batteries of the battery pack to the float charge state in (iii) at a rate of at least 1 C.

28. The controller of claim 19, wherein the state of charge of the fully charged state is 100%.

29. The controller of claim 19, wherein the state of charge of the fully charged state is 80%.

* * * * *